US005334801A

United States Patent [19]

Mohn

[11] Patent Number: 5,334,801

[45] Date of Patent: Aug. 2, 1994

[54] PIPE SYSTEM WITH ELECTRICAL CONDUCTORS

[75] Inventor: Frank Mohn, London, England

[73] Assignee: Framo Developments (UK) Limited, London, England

[21] Appl. No.: 859,367

[22] PCT Filed: Nov. 23, 1990

[86] PCT No.: PCT/GB90/01816

§ 371 Date: Jun. 18, 1992

§ 102(e) Date: Jun. 18, 1992

[87] PCT Pub. No.: WO91/08373

PCT Pub. Date: Jun. 13, 1991

[30] Foreign Application Priority Data

Nov. 24, 1989 [GB] United Kingdom .............. 8926610.0

[51] Int. Cl.[5] ........................ G01V 1/40; E21B 17/02; E21B 17/10; H01R 4/60

[52] U.S. Cl. .................................... 174/47; 166/65.1; 166/242; 439/191; 439/194

[58] Field of Search .................. 174/47, 845; 175/320; 285/419; 403/310, 313; 439/190, 191, 192, 194, 204; 166/65.1, 242

[56] References Cited

U.S. PATENT DOCUMENTS

| | | | |
|---|---|---|---|
| 3,606,402 | 9/1971 | Medney | 285/305 |
| 3,860,742 | 1/1975 | Medney | 174/845 |
| 4,220,381 | 9/1980 | van der Graaf | 439/194 |

FOREIGN PATENT DOCUMENTS

| | | | |
|---|---|---|---|
| 0257744 | 3/1988 | European Pat. Off. . | |
| 1189934 | 4/1965 | Fed. Rep. of Germany | 439/192 |
| 1230382 | 12/1966 | Fed. Rep. of Germany . | |
| 1236439 | 3/1967 | Fed. Rep. of Germany | 439/192 |
| 2440465 | 5/1980 | France . | |
| 0645785 | 11/1960 | United Kingdom | 174/47 |
| 1160805 | 8/1969 | United Kingdom | 174/47 |
| 8401189 | 3/1984 | World Int. Prop. O. . | |

*Primary Examiner*—Leo P. Picard
*Assistant Examiner*—Hyung S. Sough
*Attorney, Agent, or Firm*—Young & Thompson

[57] ABSTRACT

A pipe system comprises a plurality of pipe members (2), mechanical connections at the end regions of the pipe members whereby the pipe members can be connected together into end-to-end relationship to provide at least one fluid flow path along them, and electrical conductors (10; 110) carried by the pipe members, the electrical conductors having contact areas (19) exposed at the end regions of the pipe members so that electrical connection between the conductors of adjacent pipe members can be effected by bridging members (25) spanning the end regions of the pipe members.

27 Claims, 4 Drawing Sheets

PIPE SYSTEM WITH ELECTRICAL CONDUCTORS

FIELD OF THE INVENTION

The invention relates to a pipe system incorporating one or more electrical conductors.

More specifically the invention relates to a pipe system in which a plurality of pipe members are connected together, to provide a conduit or conduits for fluid flow and in which the pipe members include one, or usually more, electrical conductors, which are also connected together to provide for electrical power supply and/or communication along the system.

BACKGROUND OF THE INVENTION

Different requirements however apply to the effective establishment of the mechanical coupling of the pipe members and the electrical connections between. Satisfactory mechanical coupling can be achieved with quite rough handling of the pipe members, without careful alignment and without great concern for cleanliness. In an offshore drilling environment, the members of a drill string or of a production pipe stack can be assembled by stabbing the end of one member into an end of the other and then completing the mechanical connection. Electrical connection however requires rather precise engagement of contacts, which should be checked for damage and which should be clean, to ensure minimum resistance at the connection, before the connection is made.

There is known from FR-A-2 440 465 a pipe system of the kind comprising two pipe members having respective interengageable connecting means by which the pipe members are mechanically connected together in end-to-end relationship, electrical conductor means extending within each of the pipe members, and electrical connection means at the connected ends of the pipe members establishing electrical connection between the electrical conductor means of the connected pipe members.

SUMMARY OF THE INVENTION

In accordance with the present invention, such a pipe system is characterized in that the electrical connection means comprises contacts exposed at the outer surfaces of the pipe members at the end regions thereof adjacent the interengageable connecting means, and a bridging member extending across the mechanically connected ends of the pipe members mounted externally of the pipe members, the bridging member including second conductor means having second contacts exposed at positions on the bridging member adjacent the pipe members and in engagement with the contacts exposed at the outer surfaces of the pipe members.

The invention will thus be understood to provide a pipe system comprising pipe members connectible together to provide fluid flow and one or more electrical conduction paths, in which establishment of the conduction path or paths is facilitated and improved by being separated from the mechanical connection of the conductors, and effected simply by connection of a bridging member externally of the pipe members after the contacts have been inspected and if necessary cleaned.

The bridging member can have the form for example of a split sleeve and the pipe members can incorporate one or any appropriate greater number of the conductors, each having a contact at each end region of the member. Plural contacts can be located in a contact zone extending around the outside of the pipe member axially inwardly of the mechanical connection means. The bridging member, in the form of a sleeve, can then be assembled around the joint between the members to bridge over the mechanical connection means from the contact zone of one member to that of the other. The bridging connector member can if desired incorporate sensors responsive for example to stresses to which the system is subject.

The bridging member and the adjacent portions of the pipe members can be covered after assembly by an outer protective sleeve which additionally protects the mechanical joint between the pipe member and can if desired function as a stabilizer where the pipe system is a drill string.

BRIEF DESCRIPTION OF THE DRAWINGS

The invention is further described below, by way of example, with reference to the accompanying drawings, in which.

DETAILED DESCRIPTION OF THE INVENTION

Figure 1:
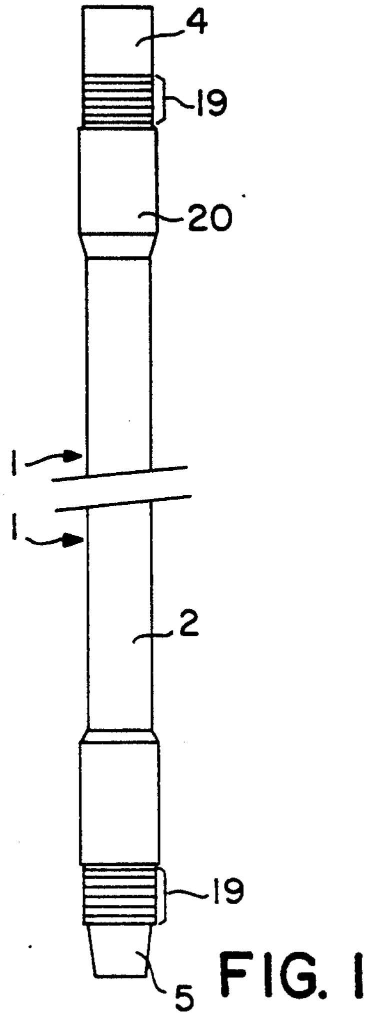
FIG. 1 is a partial side view of a single pipe stand or unit of a drill pipe incorporating electric conductors and suitable for inclusion in a pipe system embodying the invention.
Figure 3:
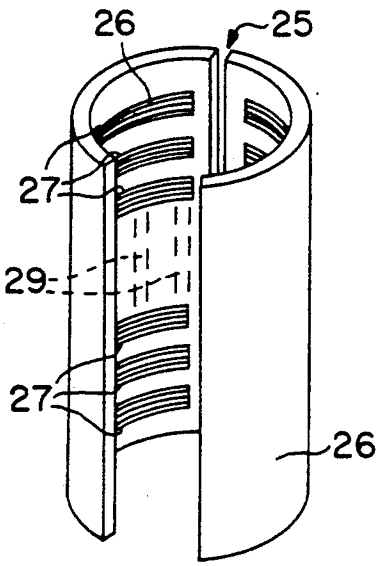
FIG. 3 is a perspective view of a connector member incorporated in the system of FIG. 2.
Figure 2:
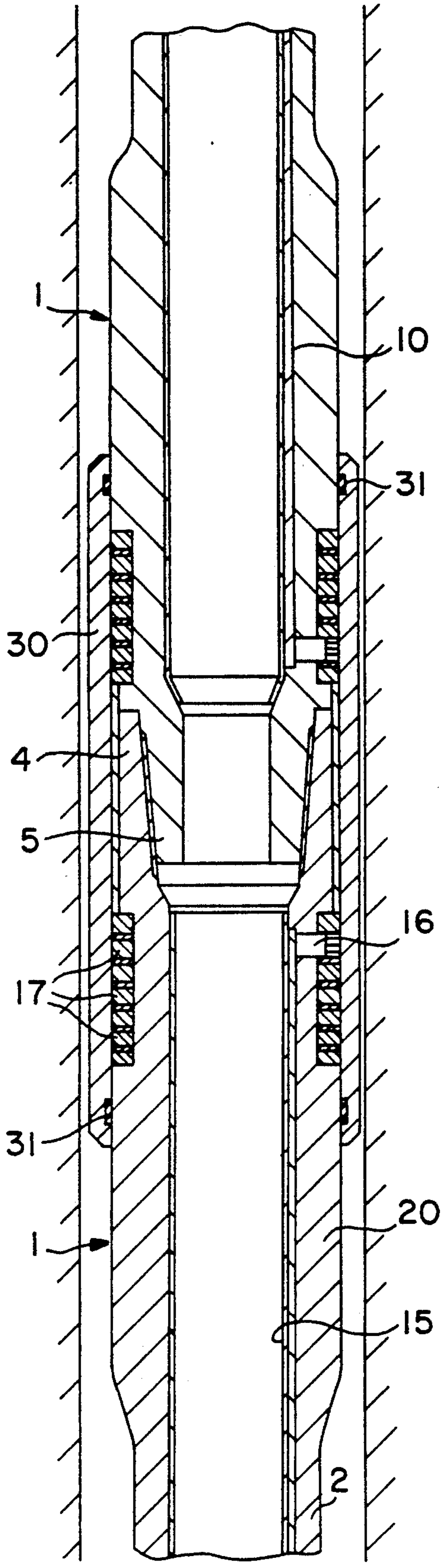
FIG. 2 is a sectional side view, on a larger scale, of two of the drill pipe units of FIG. 1 assembled together, with electrical connections in accordance with the system of the invention.

Referring now to FIGS. 1–4, the drill pipe member or unit 1 of FIG. 1 comprises an appropriate length of drill pipe 2 having at its upper and lower end regions, as shown, respectively a box end 4 with a tapering internal screw thread, and a pin end 5 with a correspondingly tapered mating external screw thread. As shown in FIG. 2, the pipe unit 1 of FIG. 1 can be mechanically assembled with a like pipe unit beneath it by stabbing in the pin end 5 to the box end 4 of the lower pipe unit and then relatively rotating the units to effect mating of the screw threads, whereby a strong mechanical connection between the two units is achieved.

Figure 4:
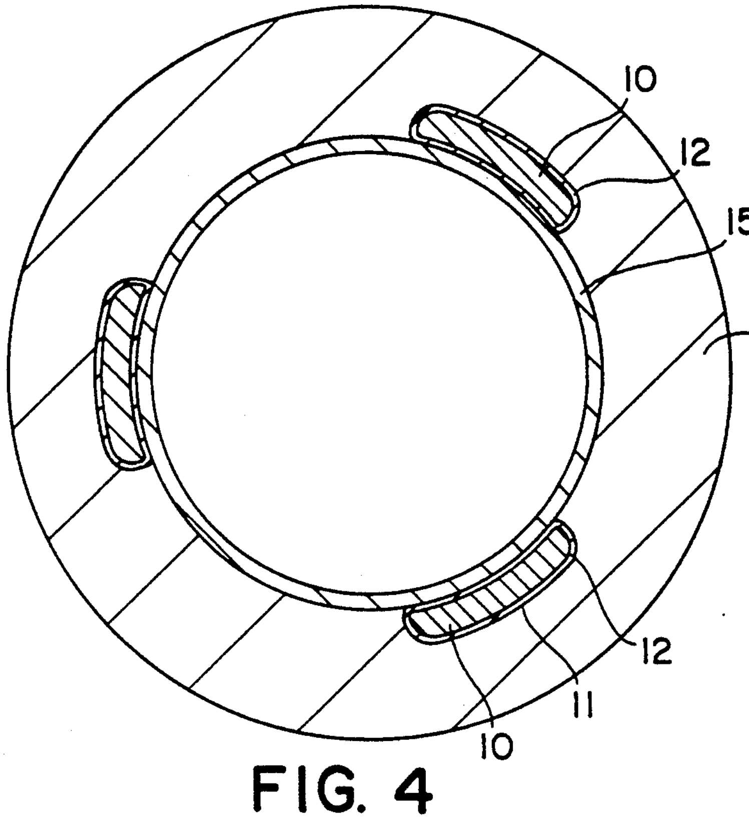
FIG. 4 is a cross-sectional view on a still larger scale of the drill pipe unit of FIG. 1.

As appears from FIGS. 2 and 4, the pipe unit 1 incorporates within it electrical conductor means, here in the form of three, like, solid, arcuate conductors 10 all centered around the axis of the drill pipe 2. As seen from FIG. 4, the interior wall surface of the pipe 2 is provided with three like longitudinal recesses or grooves 11 equiangularly spaced around the axis and each of these grooves contains one of the conductors and an insulating sleeve 12 surrounding it. The grooves, conductors and insulating sleeves are so shaped as to preserve the circular form of the pipestand inner wall, which is lined by a protective sleeve or mudliner 15.

Figure 5:
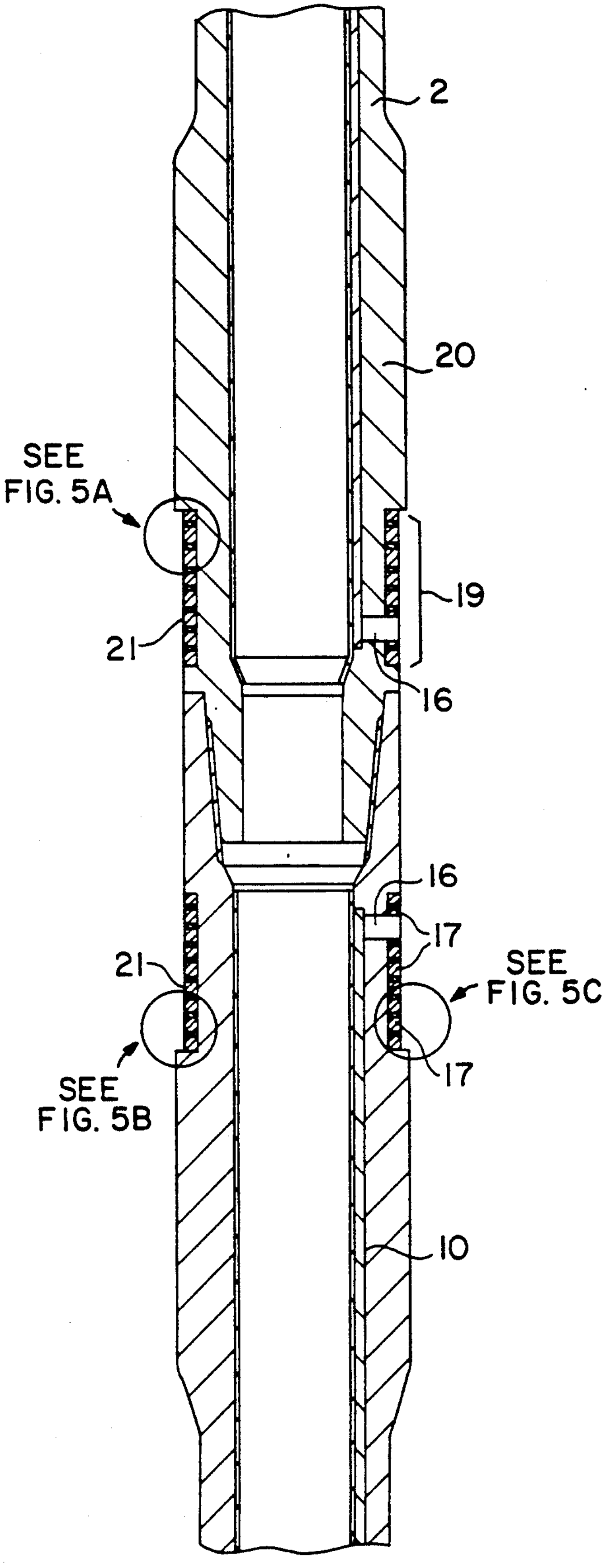
FIG. 5 is a view similar to that of FIG. 2 but illustrating alternative arrangements of electrical contacts for the electrical conductors at the end regions of the drill pipe stands.
Figure 5A:
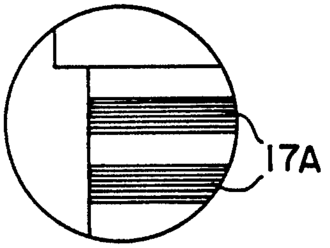
Figure 5B:
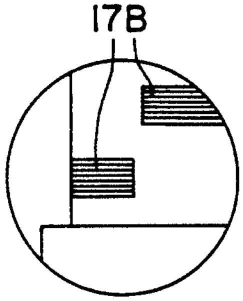
Figure 5C:
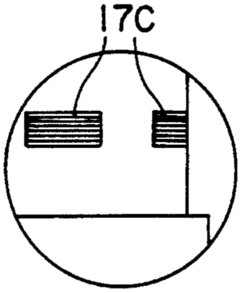

As appears from FIGS. 2 and 5, each of the conductors 10 is electrically connected at each end of the pipe unit to a respective pin 16 extending radially outwardly from the conductor to an electrical contact 17 at a contact zone 19 at the outer wall surface of the pipe unit. The pipe 2 has end portions 20 of greater external diameter terminating towards the end with a recess extending around the pipe inwardly from the pin or box end. Each recess contains an insulating sleeve 21 mounting the contacts 17 to allow electrical communication to be made with like contacts and conductors of adjacent pipe units. The two insulating sleeves 21 and the contacts 17 have outer surfaces which are continuous with the adjacent outer wall surface of the pipe units between them.

The contacts 17 can have any appropriate external shape. For example, as indicated at inset A of FIG. 5, the contacts can comprise slip rings 17A extending entirely around the unit. Alternatively, as shown in inset B of FIG. 5, they can comprise segmented slip rings 17B at three axially spaced positions. Another possibility, namely, segmented slip rings 17C at the same axial position, is illustrated in inset C of FIG. 5.

In the mechanically assembled condition of two pipe units 1 shown in FIG. 5, the two units are rigidly connected together mechanically and their communicating interiors provide a flow conduit for drilling mud. It remains to establish electrical connection between the two sets of the conductors 10. This is effected by means of bridging connector means, constituted here by bridging members 25 axially split into sleeve portions 26 shown in FIG. 3 each provided internally with electrical contact bands 27 appropriate to the pattern of the contacts 17 in the contact zones 19. The connector sleeve portions 26 are of suitable insulating material and incorporate conductor elements 29 axially extending between the contact bands 27 for establishing electrical continuity between each of the conductors 10 of one pipe unit with a respective conductor of the other pipe unit.

The thickness of the bridging connector sleeve 25 is such as to provide a smooth outer surface to the adjacent portions 20 of the two pipe units and the connector member is held in place by a protective collar or sleeve 30 which is moved into place along the pipe units. The collar is of greater axial length than the sleeve 25 and is sealed at its ends to the portions 20 by seal rings 31.

Figure 6:
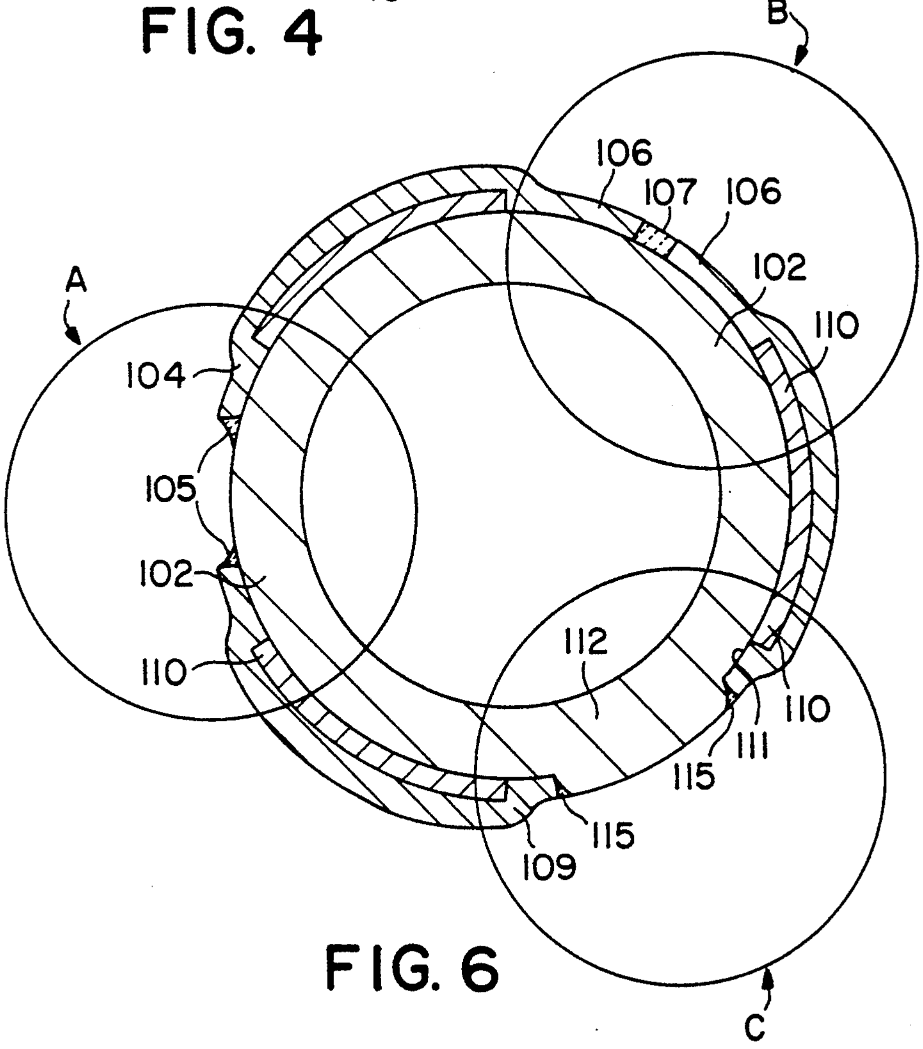
FIG. 6 is a view similar to that of FIG. 4 but showing alternative arrangements of the electric conductors in a modified drill pipe unit of the invention.
Figure 7:
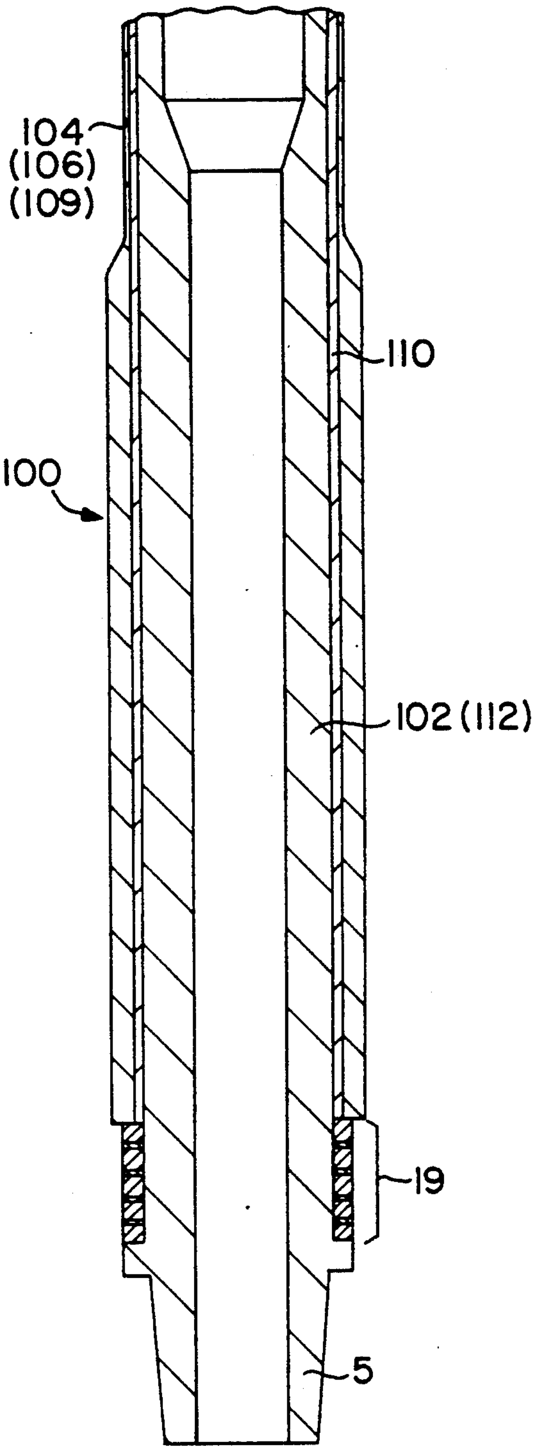
FIG. 7 shows two of the drill pipe units incorporating electric conductors in the arrangement of FIG. 6, in section, and spaced apart just prior to assembly.

FIGS. 6 and 7 illustrate alternative arrangements for solid arcuate electrical conductors 110 in a pipe unit 100 otherwise resembling that of FIGS. 1–5. In the unit 100, the conductors 110 are carried externally of the drill pipe 102 and several arrangements are possible. One possibility is shown in portion A of FIG. 6. The conductors here fit to the outer wall surface of the drill pipe 102 and are secured in place by protective ribs 104 secured to the pipe stand by welds 105.

The possibility shown at portion B of FIG. 6, corresponds to that of portion A except that each adjacent pair of the ribs 106 extend towards each other from the conductors 110, so as to be secured to the drill pipe by a single common weld 107. In the third possibility illustrated in portion C of FIG. 6, the conductors 110 and the laterally outermost portions of the protective ribs 109 are received in longitudinal grooves 111 provided in the outer surface of a drill pipe 112, the ribs being secured to their edges to the side walls of the grooves by welds 115. An electrically insulating sleeve (not shown) surrounds the conductor to insulate it from the pipe and the protective ribs.

The externally mounted conductors of FIG. 6 extend within the externally enlarged end portions 20 of the drill pipe units, the ends of which are formed with grooves in which are received the insulation sleeves of the contact zones, which can be configured as described with reference to FIG. 5. Again, the mechanical connection of two adjacent drill pipe units can be carried out before the electrical connection is established by bridge members 25, after which the protective sleeve 30 is secured in place.

The bridge connector members 25 can incorporate means for performing various functions additional to the establishment of the necessary electrical connections. The members thus may incorporate sensors or transducers by means of which stresses in the drill string can be assessed by measurement of torque and tension. Deflection could also be detected by appropriate sensors in the bridging members. The sensor outputs can be conveyed by the conductors 10, 110 to top-side equipment to permit monitoring of the drill string performance in operation.

The protective sleeve 30 can have additional functions also. It may for example function as a stabilizer, by being provided with spiral blades at its outer surface. The stability of the drill string is enhanced and vibrations and the possibility of sticking are reduced. The protective sleeves 30 additionally protect the box ends of the drill pipe units, to alleviate wear, and thus provide increased coupling life. The protective sleeve can be constituted as a replaceable part.

Although the invention has been described and illustrated with reference to a drill string, it can be embodied in a production pipe stack, or any other pipe system of which the members incorporate electric conductors.

The invention can be carried into effect in a variety of ways other than as specifically described and illustrated.

I claim:

1. A pipe system comprising:

two pipe members having interengageable connecting means by which said two pipe members are mechanically connected together in end-to-end relationship, electrical conductor means extending within each of said pipe members, and electrical connection means at the connected ends of said pipe members, establishing electrical connection between said electrical conductor means of the connected pipe members, wherein:

said electrical connection means comprise external contacts exposed at the outer surfaces of said pipe members at the end regions thereof adjacent said interengageable connecting means, a bridging member extending across the mechanically connected ends of said pipe members and mounted externally of said pipe members, said bridging member being received in recesses at the end regions of said pipe members and forming a continuous outer surface with said pipe members, and second conductor means included in said bridging member, said second conductor means having second contacts exposed at positions on said bridging member adjacent said pipe members and in engagement with said external contacts exposed at the outer surfaces of said pipe members.

2. The pipe system of claim 1, further comprising a protective sleeve around said bridging member.

3. The pipe system of claim 2 wherein said pipe system comprises a drill string and said protective sleeve carries blades externally so as to have a stabilizing function.

4. The pipe system of claim 1 wherein said bridging member incorporates sensor means responsive to at least one condition of said pipe system.

5. A pipe system comprising two pipe members, mechanical connection means effecting connection of said two pipe members together in end-to-end relationship, a plurality of electrical conductor means extending externally lengthwise of each of said pipe members, a contact portion of each conductor means externally exposed at each end region of the pipe member along which said conductor means extends, electrical bridging means electrically connecting each of said contact portions at the end region of the connected end of one of said pipe member with a respective contact portion at the end region of the connected end of the other pipe member, and a protective sleeve around said electrical bridging means.

6. The pipe system of claim 5 further comprising protective means for said conductor means extending lengthwise of each of said pipe members externally of said conductor means.

7. The pipe system of claim 6 wherein said protective means comprise a plurality of elongate members each extending externally of a respective conductor means.

8. The pipe system of claim 7 wherein said elongate members have longitudinally extending edges at which said elongate members are welded to said pipe member.

9. The pipe system of claim 8 wherein adjacent longitudinal edges of said elongate members are welded to said pipe member by a single weld.

10. The pipe system of claim 7 wherein each of said elongate members is received within a respective groove provided in the pipe member along which the elongate member extends.

11. The pipe system of claim 5 wherein each of said conductor means comprises a conductor of arcuate configuration surrounded by an insulating sleeve.

12. A pipe system comprising:

two pipe members having interengageable connecting means by which said two pipe members are mechanically connected together in end-to-end relationship, electrical conductor means extending within each of said pipe members, and electrical connection means at the connected ends of said pipe members establishing electrical connection between said electrical conductor means of the connected pipe members, wherein:

said electrical connection means comprise external contacts exposed at the outer surfaces of said pipe members at the end regions thereof adjacent said interengageable connecting means, a bridging member extending across the mechanically connected ends of said pipe members and mounted externally of said pipe members, said bridging member comprising a sleeve surrounding said mechanically connected ends of said pipe members, said sleeve comprising axially split portions, and second conductor means included in said bridging member, said second conductor means having second contacts exposed at inner surface positions on said bridging member adjacent said pipe members and in engagement with said external contacts exposed at the outer surfaces of said pipe members.

13. The pipe system of claim 12 wherein said electrical conductor means comprises plural conductors extending internally of said pipe members (2) and connected to said external contacts by conductor means extending through said pipe members.

14. The pipe system of claim 13 wherein said electrical conductor means have external insulation and are received in axially extending grooves in said pipe member inner surface, and wherein a protective sleeve lines said inner surface.

15. The pipe system of claim 12 wherein said pipe members comprise pipes and elongate ribs secured externally thereto, and wherein said electrical conductive means comprises plural conductors extending between the pipe outer surface and said elongate ribs to said external contacts.

16. The pipe system of claim 15 wherein said electrical conductor means comprise arcuate conductors and are received in external grooves in the outer surfaces of said pipe member.

17. The pipe system of claim 12 wherein said contacts of said pipe members and of said bridging member have the form of axially spaced arcuate conductors.

18. A pipe system comprising two pipe members, mechanical connection means effecting connection of said two pipe members together in end-to-end relationship, a plurality of electrical conductor means extending externally lengthwise of each of said pipe members, protective means for said conductor means extending lengthwise of each of said pipe members externally of said conductor means, said protective means comprising a plurality of elongate members each extending externally of a respective conductor means, said elongate members having longitudinally extending edges at which said elongate members are welded to said pipe member, a contact portion of each conductor means externally exposed at each end region of the pipe member along which said conductor means extends, and electrical bridging means electrically connecting each of said contact portions at the end region of the connected end of one of said pipe member with a respective contact portion at the end region of the connected end of the other pipe member.

19. In a pipe system comprising first and second pipe members in end-to-end relationship:

first and second connecting means formed at the adjacent end regions of said first and second pipe members respectively, said first and second connecting means being interengaged to establish a direct rigid mechanical connection between said first and second pipe members, a bridging member located outwardly around said adjacent end regions of said first and second pipe members, and a plurality of electrically conductive paths extending along said first and second pipe members, each said path comprising a first conductor extending along said first pipe member to a contact exposed at the outer surface of said first pipe member at said end region thereof, a second conductor extending along said second pipe member to a contact exposed at the outer surface of said second pipe member at said end region thereof, and a third conductor in said bridging member and having contacts electrically contacting said contacts of said first and second conductors.

20. The pipe system of claim 19 wherein said first and second connecting means comprise respectively a screw threaded pin end and a screw threaded box end receiving said pin end therein.

21. The pipe system of claim 19 wherein said bridging member is received in recesses at the end regions of said pipe members and forms a substantially continuous outer surface with said pipe members.

22. The pipe system of claim 19 further comprising a protective sleeve around said bridging member.

23. The pipe system of claim 22 further comprising means sealing said protective sleeve to said pipe members at positions axially beyond said bridging member.

24. The pipe system of claim 19 wherein said first and second conductors extend internally of said pipe members.

25. The pipe system of claim 24 wherein said first and second conductors have external insulation and are received in axially extending grooves in said pipe member inner surface, and wherein a protective sleeve lines said inner surface.

26. The pipe system of claim 19 wherein said bridging member comprises a plurality of axially separable portions.

27. The pipe system of claim 19 wherein said contacts of said pipe members and of said bridging member comprise axially spaced segmental contacts.

* * * * *